July 15, 1969  A. F. STAMM  3,455,494
AUTOMATIC CONTROL SYSTEM FOR FRICTION WELDING MACHINE
Filed Dec. 23, 1963  7 Sheets-Sheet 1
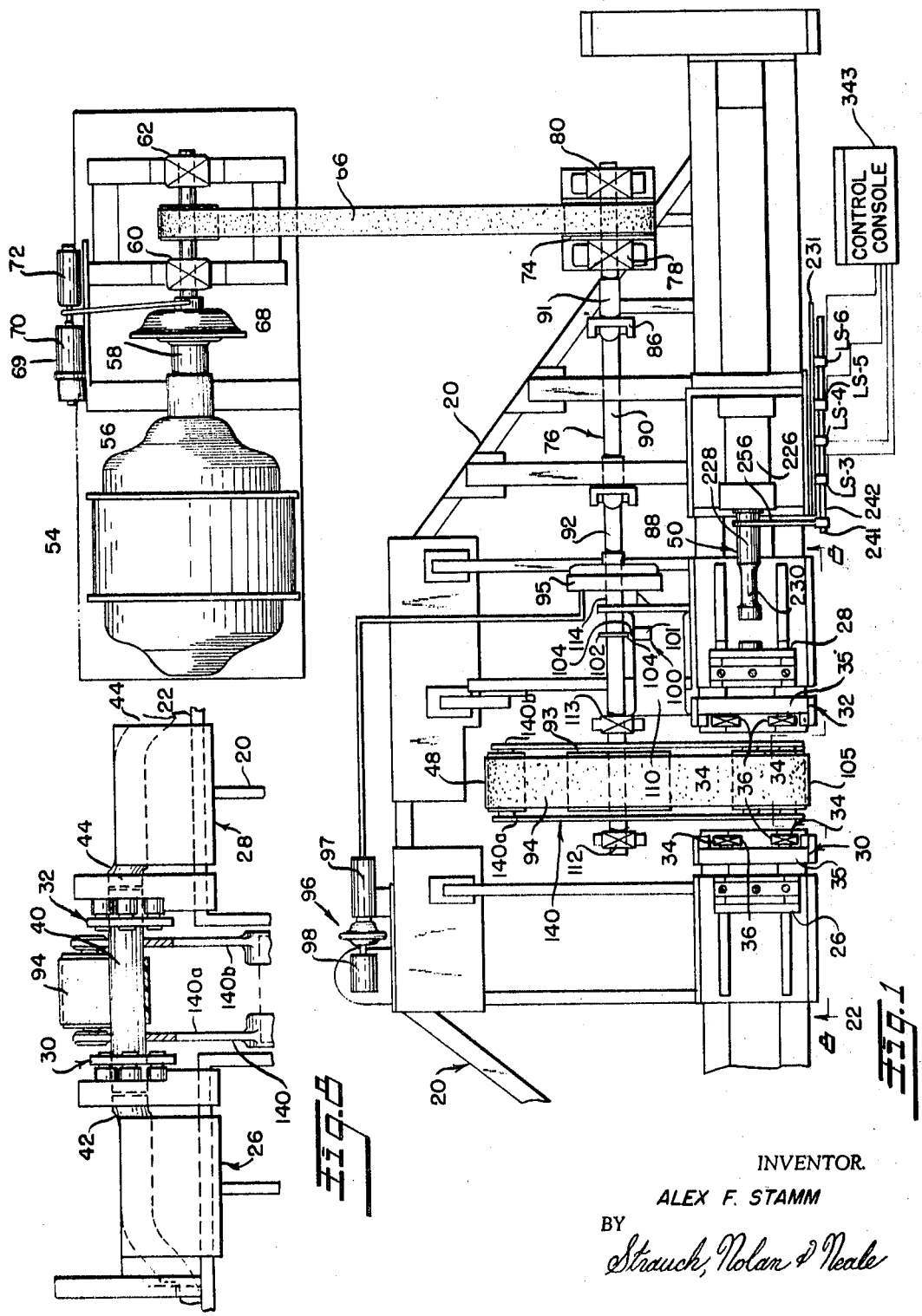
INVENTOR.
ALEX F. STAMM
BY
Strauch, Nolan & Neale

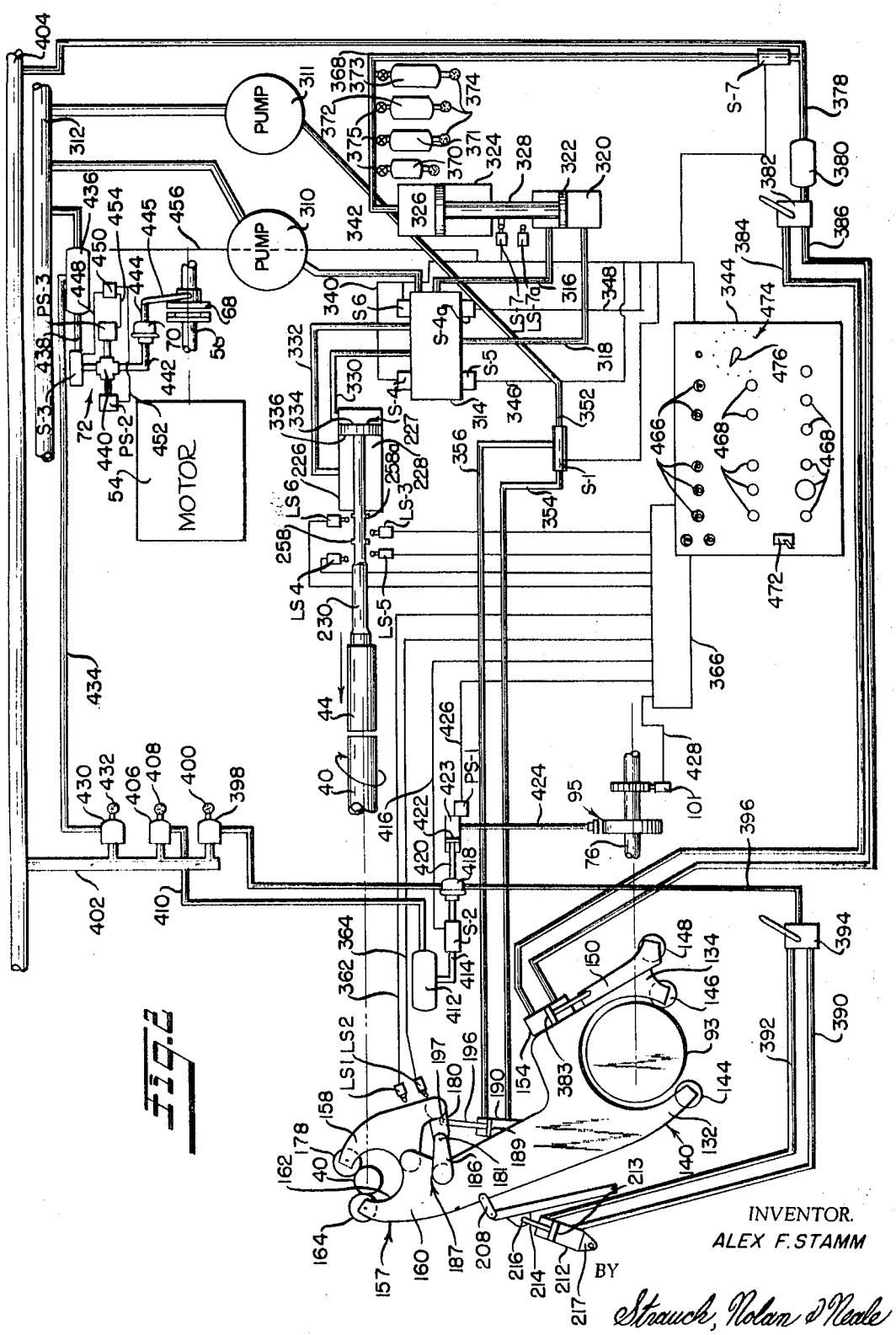

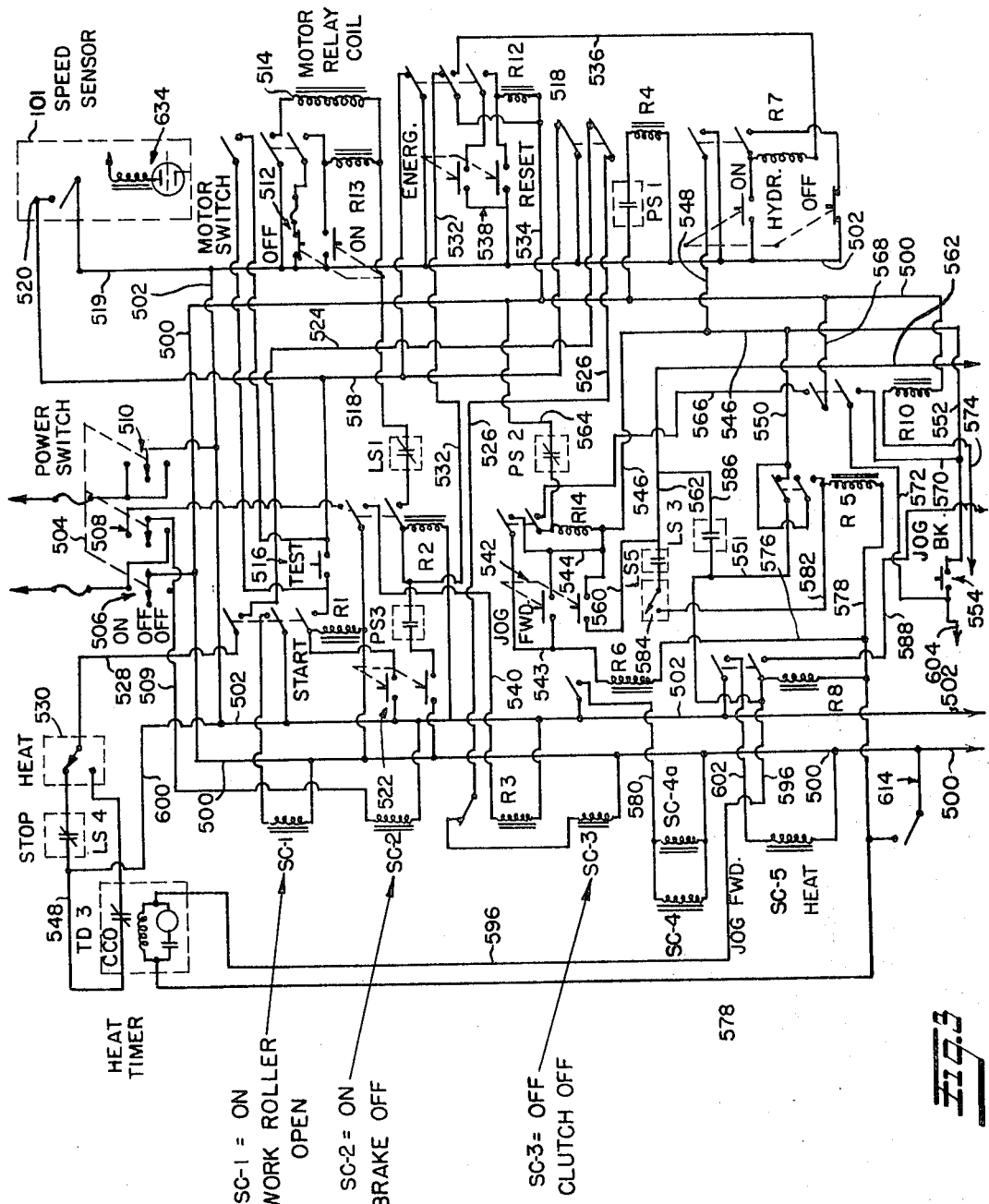

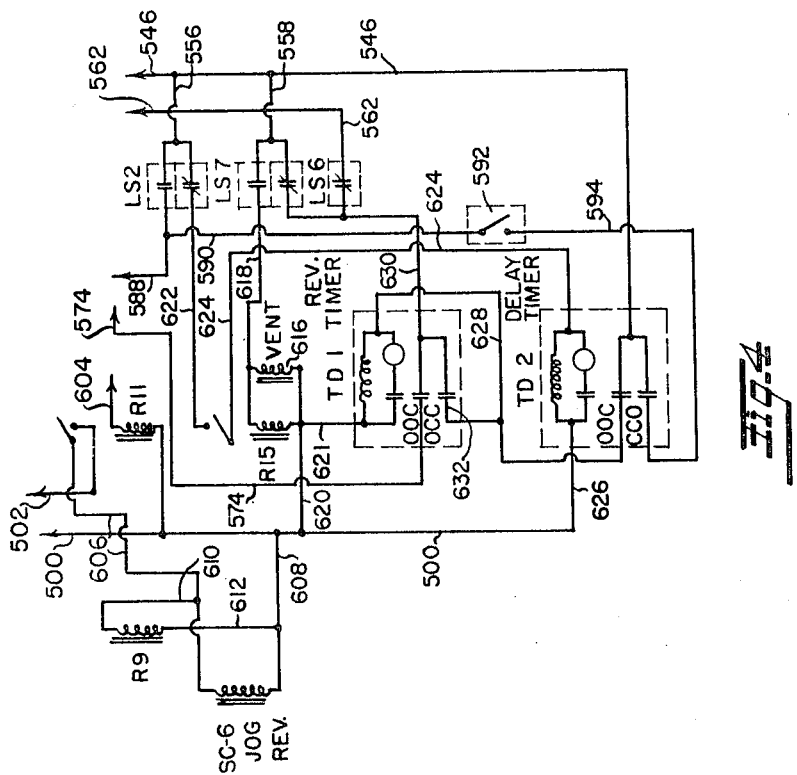

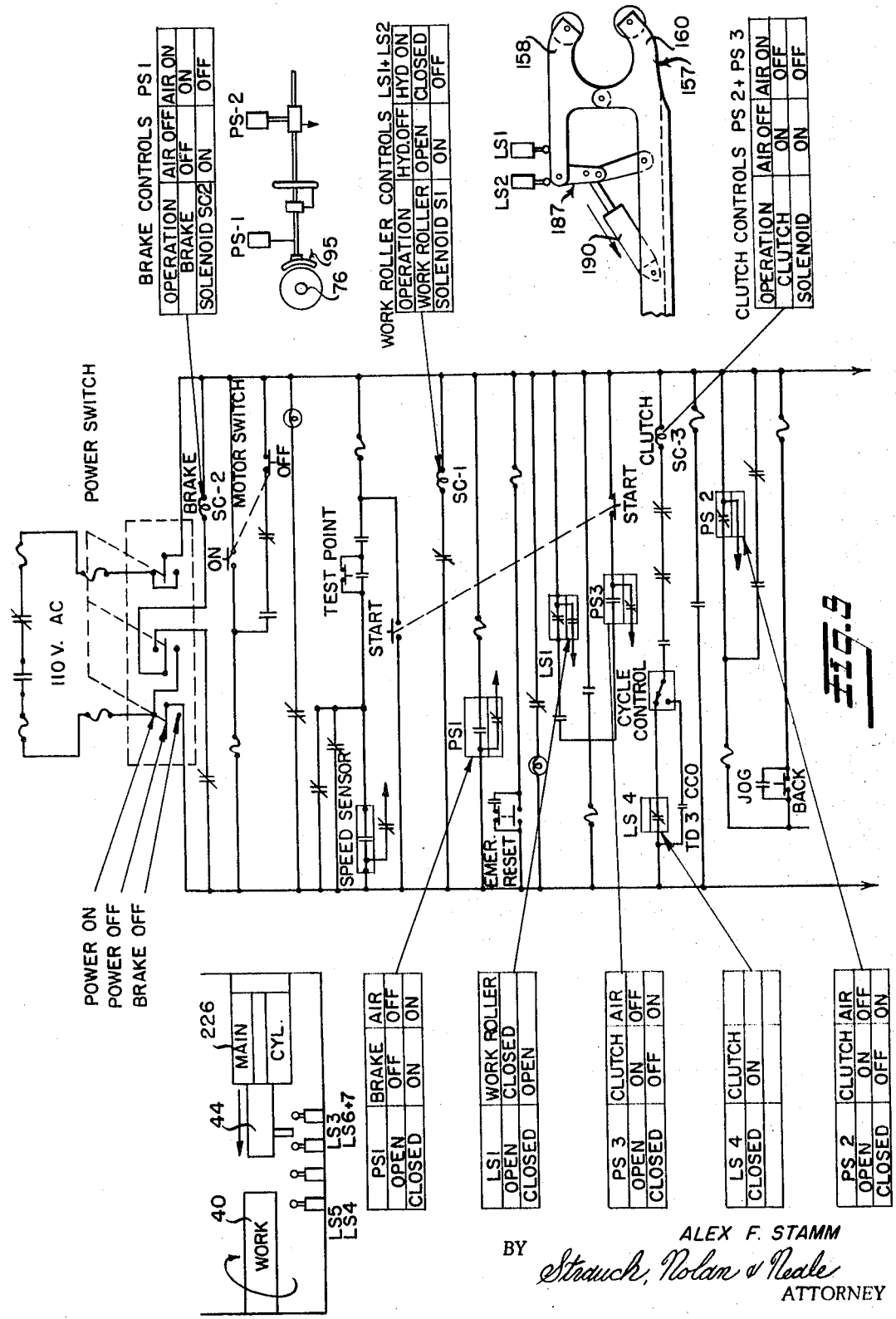

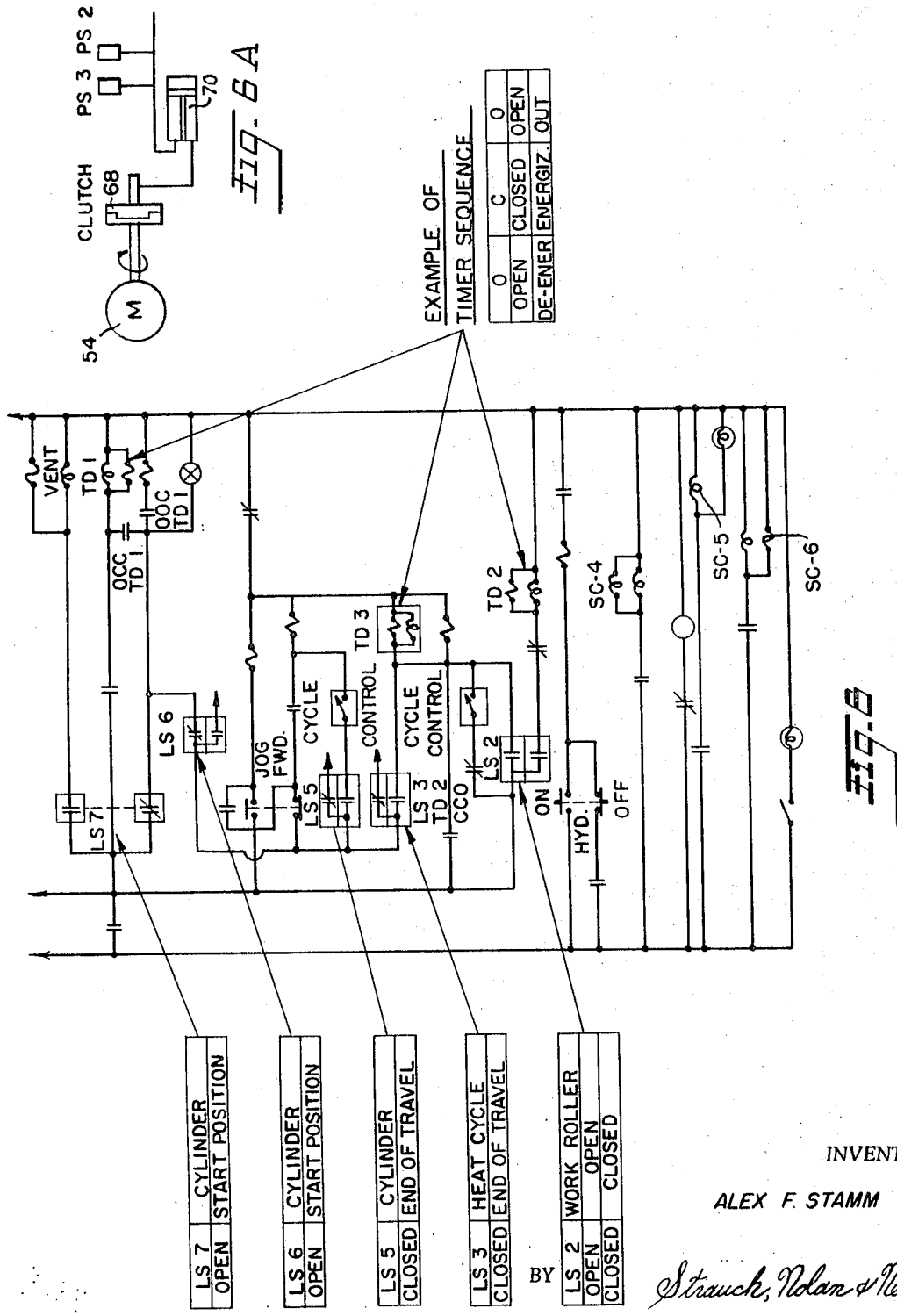

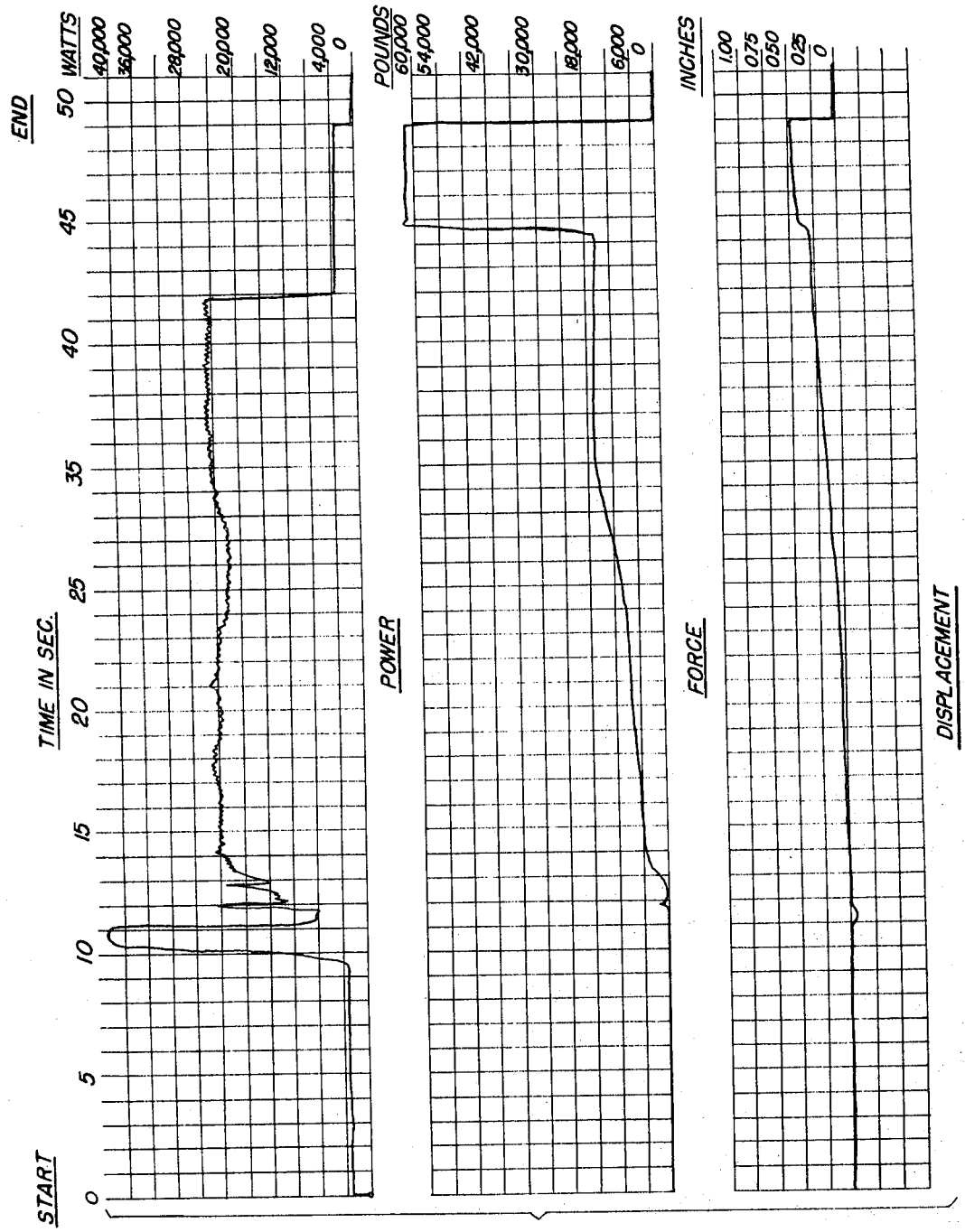

United States Patent Office 3,455,494
Patented July 15, 1969

3,455,494
AUTOMATIC CONTROL SYSTEM FOR FRICTION WELDING MACHINE
Alex F. Stamm, Rochester, Mich., assignor, by mesne assignments, to North American Rockwell Corporation, a corporation of Delaware
Filed Dec. 23, 1963, Ser. No. 332,426
Int. Cl. B23k 27/00
U.S. Cl. 228—2                                   25 Claims

ABSTRACT OF THE DISCLOSURE

A friction welding apparatus wherein at least two workpieces to be friction welded are supported for relative rotation about a common axis, wherein a drive motor is provided for imparting relative rotation to the workpieces, wherein a force producing means is provided for axially pushing the workpieces together along said axis such that the abutting ends of the workpieces are rubbed together under pressure during relative rotation of the workpieces, and wherein a control circuit operatively connected to said motor and said force producing means automatically controls the force exerted on the workpieces by the force producing means in accordance with a predetermined schedule that is characterized by an increase in the applied force to a level which will generate sufficient heat at the regions of the workpieces being rubbed together to render the workpiece regions fusible and by a further increase to a higher level when the rubbed workpiece regions become fusible. The higher force level is maintained for a predetermined period after relative rotation is stopped to allow the weld, which forms when relative rotation is arrested, to cool.

---

The present invention relates to friction welding machines of the rotary type and more specifically to an automatic programming and control system therefor.

The automatic control system of this invention is especially adapted for use with a rotary friction welding machine of the type disclosed in the commonly assigned copending application Ser. No. 332,365, filed on even date herewith. This application is entitled Friction Welding Machine and Method in which Alex F. Stamm and Paul C. Tabor are joint inventors. With this welding machine, metal articles are welded together by rotating one part against the other, or by rotating a center part between two end parts and applying axial pressure to the parts during the welding cycle. The heat generated by rubbing friction of the parts renders the metal plastic and fusible at the regions of engagement, and the application of axial pressure is applied to the parts in a manner to provide permanent rigidly bonded assemblies having predetermined dimensioned characteristics.

To effectively weld articles together having the foregoing characteristics in such a machine, a number of exacting requirements must be met. First, the rotational speed, heating time, and axial pressures must be effectively and accurately controlled. Second, it must be possible to readily index and control the welding cycle. Finally, control means must be provided for rapidly stopping rotation at a precise predetermined moment at the end of the heating period.

To effectively meet these requirements and thereby assure uniform welds of consistent high quality, it is preferred in practice to make the welding operation completely automatic. This eliminates the dependence upon the skill and speed of an operator in manually controlling the various operations needed to weld an article together with this type of machine, for even if manual operations are expertly performed, they are not always entirely satisfactory.

The present invention accordingly provides for an automatic control system which only requires the operator to manually select the operations to be performed by the machine, to set the time for each operation, to arrange the workpieces to be welded in the machine, and finally to depress a button to start the machine. The welding machine incorporating the control system of this invention then operates automatically to succesively grip the workpiece to be rotated, axially urge the workpieces into axial abutment, engage a drive for rotating the gripped workpiece to generate sufficient heat for rendering the metal plastic and fusible in regions of engagement, rapidly stop rotation of the gripped workpiece at a precise predetermined time after the metal becomes fusible, materially increase the workpiece-engaging pressure for a predetermined time to aid fusion and to pressure forge the workpieces together, and finally release the gripped workpiece, permitting the operator to remove the now-joined article from the machine.

The major object of the present invention, therefore, is to provide a novel control and sequencing system for effecting the automatic operation of a rotary friction welding machine.

A more specific object of the present invention is to provide a novel automatic rotary friction welding apparatus wherein metal articles are welded together by rotating one part against the other, or by rotating a center part between two end parts and applying axial pressure to the parts during the welding cycle.

A further object of this invention is to provide a novel rotary friction welding apparatus wherein rotation of one of the parts to be welded is automatically controlled in response to movement of one of the parts in axially urging the pieces of the article into engagement.

Still another object of this invention is to provide a novel electrical control system for automatically operating a rotary friction welding machine wherein selectively adjustable timing devices are employed in the system for repeatedly obtaining welds of identical high quality.

A further object of the present invention is the provision of a novel rotary friction welding machine which is automatically controlled to perform a pre-selected welding cycle including in sequence: engagement of the workpiece to be rotated with the stationary workpiece or pieces; relative rotation of the engaged workpieces; the application and increase of axial pressure urging the pieces together; rapid arrestment of piece rotation after the metal becomes fusible; abrupt and material increase in axial pressure for a short duration after rotation is arrested; relaxation of axial pressure; and, finally, release of the welded workpiece assembly.

Further objects of the invention will presently appear as the description proceeds in connection with the appended claims and the annexed drawings wherein:

FIGURE 1 is a partially schematic plan view of the rotary friction welding apparatus according to a preferred embodiment of the present invention;

FIGURE 2 is a diagrammatic view of the apparatus illustrated in FIGURE 1;

FIGURES 3 and 4 illustrate the electrical control and sequencing circuit shown in FIGURE 2 with FIGURE 4 being arranged beneath FIGURE 3 to complete the circuit diagram;

FIGURES 5 and 6 illustrate a schematic layout of the electrical control and sequencing circuit shown in FIGURES 3 and 4 with FIGURE 6 being arranged beneath FIGURE 5 to complete the circuit;

FIGURE 7 is a graph record of the power consumption, axial pressure force, metal displacement and welding time for a particular workpiece welded in accordance with the apparatus of the present invention; and FIGURE 8 is a fragmentary section taken substantially along lines 8—8 in FIGURE 1 and illustrating three vehicle axle sections arranged to be welded together by the apparatus.

Referring now to FIGURES 1 and 2, the rotary friction welding apparatus of this invention comprises a rigid support frame 20 which is made up of suitable interconnected structural steel members and which is fixed to a factory floor by any suitable means such as by bolting. Fixed on frame 20 is a machine bed 22 having suitable guideways which mount axially spaced apart fixtures 26 and 28. Fixtures 26 and 28 incorporate suitable chucking and clamping devices for fixedly mounted end workpieces to be welded to a center workpiece in a three-piece article.

As shown in FIGURE 1, fixture 26 is fixedly secured to the left-hand end of bed 22, and fixture 28 is longitudinally slidable along the guideways of bed 22 toward and away from fixture 26. Axially between fixtures 26 and 28 are two adjustable aligning and clamping assemblies 30 and 32 each comprising a plurality of angularly spaced apart antifriction bearings 34 mounted on a support 35 and having outer races 36 for engaging the periphery of the center workpiece to be welded to the end workpieces mounted in fixtures 26 and 28. Assemblies 30 and 32 are axially spaced so that they are positioned closely to the front faces of fixtures 26 and 28 and are described in detail in the previously identified copending application to which reference is made in the event a further description is needed for a complete understanding of the present invention.

The apparatus described herein is especially adapted to welding such articles as vehicle axles having a cylindrical center piece 40 and two end pieces 42 and 44 as shown in FIGURE 8. End pieces 42 and 44 are respectively nonrotatably and axially clamped in fixtures 26 and 28, and center piece 40, which is positioned axially between end pieces 42 and 44, is rotatably supported adjacent its opposite ends by assemblies 30 and 32. Bearings 34 are each radially adjustably mounted as described in said copending application so that races 36 engage the periphery of center piece 40.

With continued reference to FIGURES 1 and 2, center piece 40 is rotated by a belt drive assembly 48. Concomitantly with rotating center piece 40, a force applying assembly 50 is operable to slide fixture 28 toward the left, thereby forcing the two pairs of surfaces on pieces 40, 42, and 44 into heat generating frictional engagement.

As a result of applying axial pressure to axially urge pieces 40, 42, and 44 into end abutment, and by rotating center piece 40 at the same time, sufficient heat is generated to plasticize the metal at the weld locations. After the metal becomes fusible, rotation of center piece 40 is abruptly arrested by means to be presently described and the force applied by assembly 50 preferably is increased for a short interval to displace the welding metal and aid in fusion of the parts into one integral structure.

It will be understood that the apparatus described herein is not limited to welding vehicle axles and that a variety of other workpieces may be welded together in a similar manner by utilizing suitable chucking equipment. In addition, it will be appreciated that the apparatus described herein also is not limited to welding a center part to two end parts simultaneously. In other instances, one part may be clamped in the stationary fixture 26, and the other part to be welded thereto may be rotated against it. Axial pressure for urging these two parts into engagement is applied by movement of fixture 28 along bed 22.

With continued reference to FIGURES 1 and 2, the power for rotating center piece 40 is supplied by any suitable means such as an electric motor 54. Other prime movers may also be used such as, for example, internal combustion engines. An electric motor is usually preferred, however, since the electrical power requirement for this type of welding operation is relatively low. In addition, an electric motor usually is cleaner and less noisy than other types of prime movers.

As best shown in FIGURE 1, motor 54 has a power output shaft 56 which is coupled to a drive shaft 58. Drive shaft 58 is rotatably supported by a pair of axially spaced apart antifriction bearing assemblies 60 and 62 which are preferably of the self-aligning type to compensate for small misalignments. A pulley 64 fixed to shaft 58 between bearing supports 60 and 62 receives a belt 66. Shaft 58 is also provided with a clutch 68 which is preferably of the plate type and which is operable to connect or disconnect the power supply from motor 54 for driving belt 66. Clutch 68 is operated by a timed fluid clutch control mechanism 69 comprising a fluid motor 70 actuated by a solenoid-valve mechanism 72 which is directly connected to the fluid control system of the apparatus to be described later on in more detail.

With continued reference to FIGURES 1 and 2, belt 66 passes around a pulley 74 which is fixed to a main drive shaft 76. Shaft 76 is rotatably supported by anti-friction bearing assemblies 78 and 80 which are respectively on opposite sides of pulley 74. The anti-friction bearings in assemblies 78 and 80 are preferably self-adjusting to compensate for any misalignment in the assembly. Drive shaft 76 is preferably of the universal joint type comprising two universal joints 86 and 88 which connect a telescoping section 90 to two end sections 91 and 92. this shaft construction allows for angular and length adjustment. Fixed to shaft section 92 at the end of main drive shaft 76 opposite from pulley 74 is a drive pulley 93. A wide endless belt 94 of belt drive assembly 48 for rotating the center workpiece passes around pulley 93. Mounted on drive shaft 76 is a brake mechanism 95 which may be of the internally expanding type and which is operated by a timed fluid brake control mechanism 96 secured to frame 20. Brake control mechanism 96 comprises a fluid motor 97 which is actuated by a solenoid valve 98. Control mechanism 96 is similar to control mechanism 69 and is directly connected to the fluid and control system of the apparatus in a manner to be presently described.

With continued reference to FIGURES 1 and 2, a speed sensing mechanism 100 located between the brake mechanism 95 and belt 94 comprises an electrical sensing device 101. A toothed wheel 102 fixed to shaft 76 for rotation therewith has its teeth in proximity of, but not in contact with, a button 104 of sensing device 101. Device 101 is an electromagnetic transducer which is connected to the electrical control system of the welding apparatus in a manner to be described later on. Speed sensing device 101 is operable to generate a signal when rotation of main drive shaft 76 has been completely arrested upon completion of the welding cycle. In response to this signal, belt 94 is then automatically disengaged from the center workpiece. As a result, it is clear that belt 94 will not be disengaged from the center workpiece until rotation of shaft 76 has ceased.

Belt 94, as schematically shown in FIGURES 1 and 2, is located at the end of drive shaft 76 and extends into a work area 105 between assemblies 30 and 32. The input or drive pulley 93 and shaft 76 are partly supported by an adjustable bracket 110 which also mounts speed sensing device 101 as best shown in FIGURE 1. Drive shaft 76, at one side of pulley 93, is rotatably supported by antifriction bearing assemblies 113 and 114 which are secured to bracket 110 in axially spaced apart relationship. The forward end of drive shaft 76 on the other side of pulley 93 is rotatably supported by an antifriction bearing assembly 112.

Referring to FIGURE 2, pulley 93 is disposed in an open circular recess between bifurcated legs 132 and 134 of a belt drive support frame 140. Frame 140 is made up of identical upstanding parallel frame members 140a and 140b, which, as shown in FIGURE 1, are spaced apart to accommodate belt 94. Legs 132 and 134, respectively, carry idler pulleys 144 and 146 between frame members 140a and 140b. Pulleys 144 and 146 are in close adjustable proximity with the periphery of drive pulley 93 to engage belt 94. An adjustable belt tension pulley 148 for taking up the slack in belt 94 is positioned in spaced relationship to idler pulleys 144 and 146 and to drive pulley 93. Pulley 148 is mounted on a bracket 150 which is slidably secured by means not shown to the upper side of frame leg 134. An actuator for adjusting belt tension pulley 148 comprises an air cylinder 154 secured to the side of frame 140 and connected to the hydraulic control system of the apparatus in a manner to be described in detail later on.

Frame 140, as best shown in FIGURE 2, extends upwardly at a slight angle to shaft 76 and is provided at its upper end with a jaw structure 157. Structure 157 comprises a movable jaw 158 and a fixed jaw 160 which define a substantially circular recess 162 therebetween. A pulley 164 is mounted on the upper end of jaw 160. The center workpiece as shown in FIGURE 2 is adapted to be received in recess 162. Jaw 158 is pivotally secured to frame 140 at the base of fixed jaw 160 and is capable of being opened and closed to lock and unlock the center workpiece in position in a manner as will presently be described in greater detail. The jaw 158 mounts a pulley 178 opposite from pulley 164.

The mechanism for opening and closing movable jaw 158 comprises a link 180 pivotally connected at one end to jaw 158. The other end of link 180 is pivotally connected by a pin 181 to one end of another link 186. The other end of link 186 is pivotally connected to frame 140. Links 180 and 186 cooperate to form a force transmitting mechanism 187 for opening and closing jaw 158. The actuator for toggle mechanism 187 comprises a double acting power piston 189 slideably received in a hydraulic cylinder 190 which is secured to frame 140. A piston rod 196 fixed to piston 189 is pivotally connected at 197 to link 180 so that upon advance or retraction of piston rod 196, links 180 and 186 will be displaced to thereby close or open jaw 158. Cylinder 190 is connected to the control system of this invention for automatic actuation in a manner to be described later on. Suitable limit switches LS–1 and LS–2 are provided at the toggle mechanism and are actuated by opening and closing of jaw 158 in a manner to be described later on.

Belt 94 extends around pulleys 164, 178, 148, and 146, inwardly around the main drive pulley 94 and around pulley 144. Slack is provided in the belt between pulleys 164 and 178 for receiving a cylindrical workpiece which, when inserted into recess 162, depresses belt 94 inwardly. Thus, upon closing jaw 158, the workpiece will be securely supported by belt 94 and retained in the recess 162 at the work area 105 by jaw pulleys 164 and 178. The amount of slack to enable belt 94 to firmly grip the workpiece is adjustable by selectively shifting pulley 148.

To facilitate accurate axial alignment of the center workpiece with the end workpiece clamped in fixtures 26 and 28, frame 140 is adjustably supported for angular displacement to a selected position by a brace 204 which is connected at its lower end to the base of the machine in any suitable manner (not shown). The other end of brace 204 is pivotally connected to a short link 208 which in turn is pivotally connected to the front end of frame 140. To support this structure, an air cylinder 212 slidably receives a piston 213. A piston rod 214 fixed to piston 213 is pivotally connected at 216 to brace 204. The bottom of the cylinder 212 is pivotally secured to a bracket 217 which is secured to frame 201. Thus, cylinder 212 keeps frame 140 in a selected position and allows for small angular adjustment of the structure to position the rotating workpiece so that it is in accurate axial alignment with the workpiece clamped in fixtures 26 and 28.

As previously described, fixture 28 is longitudinally movable on machine bed 22 to enable axial pressure to be exerted on the workpiece to be welded together. It will be appreciated, however, that the arrangement in its entirety could be reversed; that is, the left-hand fixture 26 could be longitudinally movable and the right-hand fixture 28 could be fixed in place on bed 22. The arrangement selected depends entirely on preference and convenience in the machine shop layout.

With continued reference to FIGURES 1 and 2, a hydraulic cylinder 226 is fixed to bed 22 rearwardly of fixture 28 and receives a double acting power piston 227. A piston rod 228 fixed to piston 227 is connected to a push rod 230 which in its advanced position abuts the rear face of fixture 28. Axial displacement of piston 227, therefore, will longitudinally slide fixture 28 along bed 22. Operation of cylinder piston 227 is controlled by solenoid valves in a manner to be described later on.

Mounted on a panel 231 in front of cylinder 226 are a plurality of electrical limit switches LS-3, LS-4, LS-5, and LS-6. A rod 242 slidably mounted on panel 231 extends between switches LS-3–6 in the manner shown. The forward end 241 of rod 242 extends beyond panel 231 and mounts a bracket 256 which extends across bed 22. Bracket 256 is secured to push rod 230 so that push rod 230 and panel rod 242 will be moved longitudinally as a unit. This arrangement is only schematically shown in FIGURES 1 and 2, and for a more complete description of this structure, reference is made to the aforementioned copending application Ser. No. 332,365.

As shown in FIGURE 2, panel rod 242 mounts abutments 258 and 258a which are selectively, longitudinally adjustable on the rod to trip limit switches LS-3–6 at different predetermined positions depending on the type of workpieces to be welded together. The lower right-hand switch LS-3, which is normally open, initiates the actual heating cycle of the welding operation, the duration of which may be controlled by a timer. Axial displacement of rod 230 to a predetermined position causes abutment 258a to trip switch LS-3. In operation, abutment 258a first trips switch LS-3 to start the heating cycle. This heating cycle is then terminated when abutment 258 trips switch LS-4 which is normally closed. Tripping of switch LS-4 releases clutch 68 which in turn applies brake mechanism 95 to abruptly arrest rotation of the workpiece engaged by belt 94. Instead of employing limit switch LS-4, a suitable timer TD3 (FIGURE 3) may be incorporated in the control system to time the heating cycle in a manner to be explained later on. Forward travel of fixture 28 continues for a short perior after rotation of the center workpiece is arrested, and during this period the axial pressure is increased to aid fusion and assure a permanent bond. When abutment 258 trips switch LS-5, which is normally open, the increased pressure pushup period is ended and a solenoid valve to be described later on, is actuated to apply a constant holding pressure which is maintained for a short duration while the freshly formed welds cool. Limit switches LS-3–6 are connected in the electrical control circuit of this invention in a manner to be presently described. Limit switch LS-5 controls the work length; that is, switch LS-5 controls the amount of metal displacement at the weld, and after triggering switch LS-5, piston 227 returns to its initial position to cause limit switch LS-6 to be tripped. Switch LS-6 is normally closed and when tripped, it then conditions the control circuit to resume its starting position, thus signalling the end of one welding cycle.

As mentioned before, the welding area is between fixtures 26 and 28 and bearing assemblies 30 and 32 but is located at a sufficient distance from bearings 34 to prevent the bearings from being objectionably affected by the heat generated during the welding cycle.

The tripping positions limit switches LS-3–LS-6 are adjustable to accommodate different conditions and welding cycles, and also to accommodate a large variety of different sizes of workpieces and material. Thus, prior to any welding operation, limit switches LS-3–LS-6 and the timing devices in the system are set to be triggered at certain intervals deepnding on the type and size of workpieces to be welded together. Once limit switches LS-3–LS-6 and these timers are set, the entire welding operation will be performed automatically. The factors involved in each work cycle (rotation speed, axial pressure, heating time and axial pushup) can be easily determined for any given work condition by calculation and analysis known to those skilled in the art.

Referring to FIGURE 2, the hydraulic system comprises two pumps 310 and 311 each provided with its own fluid supply reservoir, oil cooler, water supply and waste water connections through a pipe 312. Reservoir, cooler and water supply for pumps 310 and 311 are not shown but are conventional. Pump 310 is connected by a hydraulic pipeline 312 to a central manifold distributor 314 which controls the main hydraulic circuit. Distributor 314, which is in the form of a manifold, includes separate solenoid valves S-4, S-4a, S-5, and S-6 which control a plurality of fluid outlets and which are respectively provided with solenoids or operators SC-4, SC-4a, SC-5, and SC-6. Two outlet lines 316 and 318 from manifold distributor 314 are connected to a hydraulic cylinder 320 forwardly and rearwardly of a piston 322 which is slidably mounted in the cylinder. Displacement of piston 322 is controlled by a fluid motor comprising an air pressure cylinder 324 having a piston 326 that is connected to piston 322 by a piston rod 328. Upon application of air pressure to air cylinder 324, cylinder 320 is responsive to vary the pressure in the main hydraulic system by operating as an accumulator for cylinder 226 during the heating cycle. Distributor 314 is further connected by two lines 330 and 332, respectively, to the forward pressure side 334 and reverse pressure side 336 of piston 227.

Forward movement of piston 227 in a working direction is toward the left as viewed from FIGURE 2 and is accomplished by delivery of fluid through line 330. Flow of hydraulic fluid through line 330 is controlled by solenoid valve S-4. The reverse or return movement of piston 227 is accomplished by delivery of fluid through line 332, and flow of fluid through line 332 is controlled by solenoid valve S-6. Solenoids SC-4 and SC-6 are respectively connected to a collector panel 344 by multiple electrical conductors indicated at 340 and 342. Collector panel 344 is connected to a main control panel 343. Solenoid valve S-5 connected to distributor 314 controls the pressure buildup in cylinder 226 in the forward, working direction of piston 227. Pressure buildup is first gradual, then becomes constant, and finally, when solenoid valve S-5 is de-energized, abruptly increases for a short duration as explained earlier, to forge the parts together at the end of the heating period. For this purpose, solenoid valve S-5 controls fluid flow through line 318 which is connected to cylinder 320. A multiple conductor indicated at 346 connects the solenoid operator of valve S-5 to collector panel 344. Solenoid valve S-4a also incorporated in distributor 314 functions as a relief valve which, when energized, colses on forward movement of piston 227. Solenoid SC-4a is connected to collector panel 344 by a multiple conductor indicated at 348.

Also connected to collector panel 344 are signal switches LS-7 and LS-7a which are respectively adapted to be tripped by an abutment 350 on piston rod 328. In response to the actuation of switches LS-7 and LS-7a a pilot light (not shown) on control panel 343 is illuminated to indicate the position of rod 328. This provides the operator with a signal that the hydraulic system has resumed an inactive condition after a welding operation.

With continued reference to FIGURE 2, a further solenoid valve S-1 is connected to pump 311 by line 352. Solenoid valve S-1 is provided with two outlets which are respectively connected by pipes 354 and 356 to cylinder 190. When the solenoid operator SC-1 (FIGURE 3) for operating valve S-1 is energized, fluid is supplied through pipe 354 to open jaw 158, and when solenoid SC-1 is de-energized, fluid is supplied through pipe 356 to close jaw 158. A multiple conductor indicated at 360 connects solenoid SC-1 to collector panel 344.

Limit switches LS-1 and LS-2 are positioned to be actuated by movement of jaw 158 between its opened and closed positions for respectively actuating brake mechanism 95 and solenoid valve S-5 as will be explained in detail later on. Multiple conductors indicated at 362 and 364, respectively connect limit switches LS-1 and LS-2 with another collector panel 366 which is electrically connected to control panel 343.

The pressure side of air cylinder 324 is connected by a line 368 to a series of pressure tanks 370-373 of varying storage and pressure capacity. Air in tanks 370-373 is selectively introduced into line 368 by valves 375 depending on the pressure requirements needed for a given work condition. Pressure gauges 374 connected to tanks 370-373 visibly indicate the pressure of air therein. Line 368 is connected to a solenoid valve S-7 which has an outlet connected by a pipe 378 to a storage tank 380. Tank 380 has an outlet connected to a manually actuatable valve 382. Tank 380 is also connected by pipe 378 to a main air supply line 404. Two lines 384 and 386 connect the valve 382 to cylinder 154 on opposite sides of a piston 383 which is slidably received in cylinder 154. Piston 383 is displaced by manual actuation of valve 382 prior to starting the automatic operation of the welding apparatus to obtain the proper belt tension for rotating the center workpiece. Thereafter, operation of displacement of piston 383 is under the control of solenoid valve S-7.

Cylinder 212 is connected by two pipes 390 and 392 to a manual lever valve 394. Valve 394 controls supply and exhaust of fluid with respect to cylinder 212 for lowering and raising of frame 140 in arranging the workpieces in the welding machine. A pipe 396 connects valve 394 to an air pressure regulator 398 which is equipped with a gauge 400 to indicate the working pressure. Regulator 398 is connected by a pipe 402 to air supply line 404. Line 404 is connected to a suitable air compressor (not shown).

Connected to pipe 402 is another air pressure regulator 406 which also has a pressure gauge 408. Regulator 406 is connected by a pipe 410 to a storage tank 412 for supplying air to actuate brake mechanism 95. Tank 412 is provided with an outlet pipe 414 which is connected to a solenoid valve S-2 having a solenoid SC-2 (FIGURE 3). When solenoid SC-2 is de-energized valve S-2 is positioned to actuate a diaphragm actuator 318 having a push rod 420 which is connected to a piston 422 slidably received in a hydraulic cylinder 423. A multiple conductor indicated at 416 electrically connects solenoid SC-2 to panel 366.

With continued reference to FIGURE 2, a pipe 424 connects cylinder 423 to brake mechanism 95 which is normally in "off" position when the machine is shut down. Displacement of piston 422 to energize brake mechanism 95 for arresting rotation of shaft 76 actuates a pressure switch PS-1, the function of which will be described later on. Pressure switch PS-1 is electrically connected by a multiple conductor indicated at 426 to collector panel 366. Sensing device 101 also is connected to panel 366 by a multiple conductor indicated at 428.

A third air pressure regulator 430 having a gauge 432 is connected to pipe 402. A line 434 connects the outlet of regulator 430 to a storage tank 436 for furnishing pressurized air to clutch control mechanism 69. Tank 436 has an outlet pipe 438 connected to a solenoid valve S-3. The outlet of valve S-3 is in fluid communication with a fitting which is connected by a pipe 442 to motor 70. Motor 70 comprises a diaphragm actuator having a push rod 444 connected to an actuating lever 445 of clutch 68. Clutch 68 is engaged and released when the solenoid operator SC-3 of valve S-3 is respectively energized and de-energized. The solenoid operator of valve S-3 is connected to a distributor box 450 by a multiple conductor indicated at 448. Two other branches of fitting 440 are respectively connected to pressure actuated electrical switches PS-2 and PS-3. Multiple conductors indicated at 452 and 454, respectively, electrically connect switches PS-2 and PS-3 to distributor box 450 which in turn is electrically connected to collector panel 344 by a multiple conductor indicated at 456. Pressure switches PS-2 and PS-3 are actuated by air pressure in the clutch actuating mechanism depending on whether the clutch is released or engaged for a purpose to appear later on in the description. Multiple conductors indicated at 458, 460, 462, and 464, respectively, electrically connect switches LS-6, LS-4, LS-5 and LS4a to collector panel 366.

Panel 343, which enclosed the electrical control circuit is shown in FIGURES 3 and 4, is provided with a row of signal lights 466 for indicating the condition of position of various components of the apparatus previously described. Arranged in two rows below, lights 466 are a series of push button switches to be described later on and having push buttons generally indicated at 468. The function of these push buttons are as follows:

| | |
|---|---|
| Motor | On-off (for Motor 54). |
| Emergency reset | Opens jaw 158 if not previously opened. |
| Hydraulic control | On-off (for pumps 310 and 311). |
| Start | To start operation of the machine. |
| Test | For test run prior to automatic operation. |
| Emergency stop | For stopping the machine during operation. |
| Reverse | Return all actuators to initial position. |
| Jog reverse | For independent return of piston 227. |
| Jog forward | For independent forward movement of piston 227. |

The last three buttons mentioned above are for independent operation of cylinder 226 during preliminary adjustment of the welding machine prior to an automatic welding operation. A main switch 472 is mounted on panel 343 for connecting a power source to the control circuit enclosed in panel 343. A test dial 474 with a manual rotatable switch 476 is employed to test all the position switches for proper functioning prior to starting the machine.

From the foregoing, it is clear that clutch mechanism 68 and brake mechanism 95 are actuated by compressed air rather than by pressurized liquid. This renders these mechanisms more quickly responsive. Pistons 227 and 189, on the other hand, are hydraulically actuated. Both the air and hydraulic systems, however, are controlled by the electrical circuit of this invention.

Pistons 213 and 383 are also actuated by compressed air. Piston 213 is only manually operated and is therefore not responsive to the automatic control system of this invention.

The foregoing structure is more fully disclosed in the aforementioned copending application to which reference is made in the event a more detailed description is needed for a complete understanding of this invention.

With reference to FIGURES 3 and 5, the electrical control and sequencing circuit of this invention comprises main conductors 500 and 502 which are connected to the arms of the outer poles 506 and 510 of a three-way, three-pole main switch 504 which connects the circuit with a 110 v. A.C. power supply when the switch is turned to the "on" position. In the "on" position, the center pole 508 of switch 504 is connected to a relay R2 and in the "off" position, center pole 508 is connected by a conductor 509 to one terminal of solenoid S-2. The other terminal of solenoid S-2 is connected to conductor 502.

The poles of a push button motor switch 512 for motor 54 are connected at one side to conductor 502 and at the other side to a contact and arm of a relay R13. The push button for switch 512 is mounted on panel 343 as previouslydescribed. Another contact of relay R13 is connected to a motor relay coil 514. The operating coil of relay R13 is connected through limit switch LS-1 to another contact of relay R2. A third contact and arm of relay R13 are connected to the opposite poles of a push button test switch 516. The push button for switch 516 is mounted on panel 343 (FIGURE 2) as previously described.

One pole of test switch 516 is also connected to a contact of a relay R1 whereas the other pole is connected to a conductor 518 which is connected to the pole of the speed sensor 520 of the device 101 and contacts of relays R12 and R4 whose arms are connected to conductor 502. The switch blade of switch 520 is connected by a conductor 519 to conductor 502.

One terminal of the coil of relay R1 is connected to an arm of the relay R2 and to conductor 500 and the other terminal of the coil of relay R2 is connected to a pole on the starter switch 522. Another contact of the relay R1 is connected to one terminal of solenoid SC-1. The other terminal of solenoid S-1 is connected to the conductor 500. The arm of this contact of relay R1 is connected to conductor 502. A third contact of relay R1 is connected by a conductor 524 to the arm of a relay R4 whose arm is connected by a conductor 526 to the arm of a relay R3. The arm of the third contact of relay R1 is connected by a conductor 528 to the contact arm of a first cycle control switch 530 whose contacts are connected to limit switch LS-4 respectively timer TD3.

One side of the dual poles of the starter switch 522 is connected to conductors 500 and 502 respectively and the remaining pole is connected through pressure switch PS-3 to the coil of relay R2. The other terminal of the coil of relay R2 is connected to conductor 502 and the arm of the LS-1 relay contact is connected by a conductor 532 to a contact in relay R12 whose arm is connected by a conductor 534 to conductor 500. Another contact for the same arm is connected by a conductor 536 to the coil of a relay R7. A third contact and arm of relay R12 are connected to one side of the dual poles of the reset switch 538 which is actuated by its push button on panel 343 (FIGURE 2). The other side of the poles of the reset switch 538 are connected to conductor 502.

The contact of the relay arm of relay R3 is connected to one terminal of solenoid SC-3. The other terminal of solenoid SC-3 is connected to conductor 500. The coil of relay R3 is connected at one end to conductor 502 and at the other end by means of a conductor 540 to another contact of relay R2.

Referring now to FIGURES 3 and 4 and also to FIGURES 5 and 6, one of the upper poles of the dual pole forward switch 542, which is actuated by its push button on panel 343, is connected to a conductor 543 which connects the coil of a relay R6 with a contact arm of a relay R14. The other upper pole is connected to a conductor 544 which connects the contact of relay R14 with a conductor 546. Conductor 546 is connected to one of the lower poles of switch 542, to the coil of relay R14 and at various points by a conductor 548 to the contact arm of relay R7 (the contact being connected to conductor 502), by a conductor 550 to a contact of relay R5 (whose contact arm is connected by a conductor 551 to one contact arm of a relay R8), by a conductor 552 to a pole on the jog back switch 554, by a conductor 556 to limit switch LS-2, by a conductor 553 to limit switch LS-7 and then goes into the timer circuit of timer TD2. The other lower pole of forward switch 542 is connected by a conductor 560 to a conductor 562 which in turn is connected into limit switch LS-5 and limit switch LS-6.

The other terminal of the coil and second contact arm of relay R14 are connected to pressure switch PS-2 which input is connected through a conductor 564 to conductor 500. The contact of the second contact arm of relay R14 is connected by a conductor 566 to a contact in the relay R10 whose contact arm is connected by a conductor 568 to conductor 500. The other contact of relay 10 is connected by a conductor 570 to conductor 552 which connects to a pole on the jog back switch 554 and the contact arm thereof is connected by a conductor 572 to the other pole of the jog back switch 554. One terminal of the coil of relay R10 is connected to conductor 500 and the other terminal of the coil is connected by a conductor 574 into the timer circuit of timer TD1.

The other terminal of the coil of relay R6 is connected by a conductor 576 to a conductor 578 which connects one end of the coil of relay R5 with the coil of the timer circuit of timer TD3. The contact arm of relay R6 is connected to conductor 502 and the contact thereof is connected by a conductor 580 to solenoids SC-4 and SC-4a which are shunted in parallel and which are connected at their other ends to conductor 500.

The other terminal of the coil and the second contact of relay R5 are connected by a conductor 582 to the contact of a second cycle control switch 584 whose contact arm is connected to limit switch LS-5. The contact arm of the second contact of relay R5 is connected to conductor 550.

Limit switch LS-3 is connetced to conductor 551 and by conductor 586 to conductor 562.

The first contact of relay R8 is connected by conductor 588 to limit switch LS-2 and by a shunt conductor 590 to the contact arm of a third cycle control switch 592 whose contact is connected by a conductor 594 into the timer circuit TD2. The contact arm of the first contact and one terminal of the coil of relay arm of the first contact and one termial of the coil of relay R8 are connected by conductor 596 into the timer circuit of timer TD3 which is connected by a conductor 598 to the limit switch LS-4 and by a shunt conductor 600 to conductor 502. The other terminal of the coil of relay R8 is connected to conductor 578. The second contact of relay R8 is connected by a conductor 602 to solenoid SC-5. The other operating coil terminal of solenoid S-5 is connected to conductor 500. The contact arm of the second contact is connected to conductor 502.

One pole of jog back switch 554 is connected by conductor 604 to the coil of a relay R11 whose other end is connected to conductor 500. The contact of relay R11 is connected to conductor 502 and its associated contact arm is connected by conductor 606 to solenoid SC-6. The other terminal of solenoid SC-6 is connected by a conductor 608 to conductor 500, and by a shunt conductor 610 to the coil of a relay R9 whose other end is shunted by a conductor 612 into conductor 500. The contact of relay R9 is connected to conductor 578 and its associated contact arm is connected by a conductor 614 to conductor 500.

One end of a coil of a relay R15 which is shunted in parallel with a vent coil 616 is connected by a conductor 618 to the limit switch LS-7 and the other end is connected by a conductor 620 to conductor 500 and by a shunt conductor 621 to the coil of the timer circuit of timer TD1. The contact of relay R15 is connected by a conductor 622 to limit switch LS-2 and the associated contact arm is connected by a conductor 624 to the coil of timer circuit of timer TD2.

The other end of the coil of timer TD2 is connected by a conductor 626 to conductor 500 and the other end of the coil of timer TD1 is connected by conductor 628 into the circuit of timer TD2. A shunt connection 630 leads from the timer circuit of timer TD1 into limit switches LS-6 and LS-7 and a crossover connection between the circuits of the timers TD1 and TD2 is provided by a conductor 632.

The timers TD1, TD2 and TD3 are of commercially available construction and may embody circuits similar to the one disclosed in United States Letters Patent No. 2,175,864. The speed sensing device 101 comprises an electronic sensing circuit 634 which relays its signals to the main circuit.

Shown in FIGURES 3-6 are the positions and functions of the various limit and pressure switches. From these figures it will be seen that the "on" or "off" position of the brake mechanism 95 controls the "on" or "off" position of clutch 68; in other words, brake mechanism 95 must be "off" in order for clutch 68 to engage. Likewise, to apply brake mechanism 95, clutch 68 must be "off."

The initial starting positions of the various solenoids and switches when the electric power, air and hydraulic are off is as follows:

SOLENOIDS

Solenoid SC–1=Energized (on)—holding work roller jaw 158 open
Solenoid SC–2=Energized (on)—holding brake in "off" position
Solenoid SC–3=Energized (on)—holding clutch engaged ("on")
Solenoid SC–4=De-energized—pressure (heat) off
Solenoid SC–4a=De-energized—drain open
Solenoid SC–5=De-energized—heat off
Solenoid SC–6=De-energized—work pressure cylinder returned
Solenoid SC–7=Energized—belt tension (at work) released

LIMIT SWITCHES

LS–1=Closed—work roller jaw 158 open
LS–2=Open—work roller jaw 158 open
LS–3=Open—heat cycle "off"
LS–4=Closed—clutch engaged
LS–5=Open—work pressure cylinder in start position
LS–6=Closed—work pressure cylinder returned

PRESSURE SWITCHES

PS–1=Open—air off, brake "off"
PS–2=Closed—air off, clutch engaged
PS–3=Open—air off, clutch engaged (These switches are operated by air pressure)

Speed sensor relay—closed

Although these are the positions of all switches with all power off it is preferred to have the air power on at all times to allow air pressure to hold the brake mechanism 95 engaged and drive clutch 68 disengaged instead of maintaining mechanism 95 disengaged and clutch 68 engaged. With the air turned on but the electric power off, the brake and clutch operating solenoids and switches remain in the positions as mentioned above since there is no electrical current to actuate them.

Before the first operation of the rotary friction welding machine embodying the present novel control system of this invention, preliminary adjustments must be made to assure proper functioning of the controls and actuators. These preliminary adjustments are as follows:

With the electric power off, the air pressure holds brake mechanism 95 "on" and clutch 68 "off" even though the brake relay R2 (FIGURE 4) is open which normally is the brake "off" condition, because there is no current in the brake releasing solenoid SC-2. By turning electric power on at panel 343, relay R2 is closed through the emergency relay R12, keeping mechanism 95 "on"; clutch 68 remains "off" even though the clutch relays R3 and R4 are closed while the power is being turned on, because the clutch circuit remains open until the "start" button is pressed. For clutch 68 to engage, brake mechanism 95 must of "off" which means, relays R2 and R3 and pressure switch PS-1 are open, jaw 158 must be closed (relay R1 closed) and cylinder 226 must signal drive condition (limit switch LS-4 closed).

The "emergency" light on panel 343 when illuminated signals that the brake mechanism 95 is "on," clutch 68 is "off," jaw 158 is last position and hydraulic "off." If jaw 158 is open depression of the "start" button will close it without starting the machine since the hydraulic is off.

Pushing of the "emergency reset" button restores the clutch, brake and work roller jaw circuit although the hydraulic remains off and the machine does not start until the hydaulic "on" button is pressed. When the machine is in operation, jaw 158 cannot open until work rotation has completely stopped.

At the preliminary adjustment, the pressure at the air brake reservoir 412 is set at 60 p.s.i. with a recommended maximum of 90 p.s.i. The clutch air regulator 430 is then set 50% higher than normally required to assure full clutch release. The speed of the clutch release depends upon this, and as high a value as possible at the regulator is desired without causing damage to the clutch actuating linkage. The pressure switches PS-2 and PS-3 at the clutch mechanism are then set in such manner that PS-2 will close just before the clutch is fully engaged, that is, near the optimum PS-1 gauge and PS-3 will close at an air pressure which just fully releases the clutch, the pressure differential being adjusted such that PS-2 opens as the clutch releases and PS-3 opens when the clutch is fully engaged.

Piston displacement in cylinder 154 is adjusted such that piston 383 will not bottom before jaw 158 completely closes. If piston 383 is allowed to bottom before jaw 158 is completely closed, the force on the belt 94 may become excessive with the result that it may break. The time of travel of the belt tension slide is set at solenoid S-7 and is just prior to the opening of jaw 158. The position of limit switch LS-1 at the work drive mechanism is set such as to cause brake mechanism 95 to completely release just before jaw 158 is closed all the way. Limit switch LS-2 is set such that it opens when the belt tension slide 150 reaches the stop. This results in a fast cycle operation.

At the axial pressure mechanism the stops and guide bearing rollers are accordingly adjusted to suit the particular workpiece. The main regulator for pressure cylinder 226 is set at 1500 p.s.i. (For a 5 sq. in. work) and limit switches LS-3, LS-4 and LS-5 are set to contact in this order.

The duration of the heat cycle, that is, the actual welding tme can be determined for any workpiece by adjustments, at the air-hydraulic accumulator cylinder assembly 320, 324 by adjusting the length of push rod 328 between pistons 322, and 326, thus providing the desired clearance volume in cylinder 324.

The emergency stop button on panel 343 is only used in an actual emergency in case of malfunction during operation of the machine. Pressing of this button applies brake mechanism 95 which simultaneously released clutch 68. Jaw 158, however, will not be opened. In this case, jaw 158 is opened by pressing the "emergency reset" button which returns all components to the starting position. In general, with the air turned on and after the power is turned on at panel 343 the "emergency reset" button must be turned on to put the control circuit in its starting position. With the hydraulic still "off" the limit switches LS-3, LS-3, LS-5, LS-6, and LS-7, pressure switch PS-2, reverse button and jog reverse and forward buttons are inoperative.

After the workpieces have been properly inserted, aligned and clamped in the machine, that is, in the fixtures 36 and 38 with the rotatable center piece 40 being supported in assemblies 30 and 32 and in the loop belt 94 between jaw pulleys 164 and 178, the machine is ready for operation.

Machine operation

When the machine is inactive, that is, when electric power is off, air pressure, which should be on at all times, holds brake mechanism 95 on and clutch 68 off. After preliminary adjustments of the power control system to suit a given work condition and after testing of all switches and controls, power on the panel 343 is turned on by switch 472, the pump motors for the pumps 310 and 311 are turned on. Also electric motor 54 is turned on by pushing the "on" button on panel 343. Although the electric power is turned on brake mechanism 95 remains on and clutch 68 remains off by means of emergency relay R12 which energizes brake relay R2. Although clutch relays R3 and R4 are likewise closed when the power is turned on, clutch 68 remains off since the clutch circuit is still open. Then the emergency is reset by pushing the "reset" button on panel 343. Hydraulic power is turned on by pressing the "on" button beneath the hydraulic signal light. By pressing the "reverse" button, full return of piston 227 to its starting position is assured.

Then limit switches LS-3, 4, and 5 are set and the heat cycle is calibrated for the given work conditions as previously described. Timer TD3 is adjustable to provide the desired heat cycle in place of switch LS-4.

Pressing the "start" button on panel 343 causes the relay R1 to close and hold pressure switch PS-3 open and also de-energizes solenoid SC-1, causing hydraulic pressure to be applied to piston 189 to close jaw 158. At the same time, the speed sensor relay is pulled out and the heat timer TD3 respectively limit switch LS-4 are coupled into the circuit by the cycle control switch 530. When jaw 158 closes, it also closes limit switch LS-2 and opens the limit switch LS-1. Opening of the limit switch LS-1 opens relay R2 and closes relay R3 which causes energization of brake solenoid SC-2 thereby releasing brake mechanism 95; the closing of relay R3 closes the clutch circuit. When brake mechanism 95 is released, pressure switch PS-1 is opened releasing relay R4 which causes clutch 68 to be engaged by energization of solenoid CS-3 and which also restores the pressure switch PS-3 to the circuit, so that rotating force will be transmitted from the already rotating motor drive shaft 58 to belt 66 to rotate drive shaft 76. Rotation of shaft 76 rotates pulley 93 to drive belt 94 for rotating the center workpiece indicated at 40 in FIGURE 8. When rotation of drive shaft 76 is started, the speed sensor relay closes to activate the speed sensor circuit. Relay R4 latches into relay R1 to keep jaw 158 closed.

The air pressure which applies clutch 68 causes pressure switch PS-2 to close and pressure switch PS-3 to open. Closing of pressure switch PS-2, closes relays R6 and R14 to energize solenoid SC-4 to open its associated valve to apply hydraulic pressure axially to displace piston 227 in the forward work engaging direction indicated by the arrow in FIGURE 2. This action starts the heating cycle. The drain solenoid SC-4a is in electrical parallel with solenoid SC-4 and upon forward travel, the drain valve will be closed. Upon forward travel of piston 227, the end faces of the workpieces will be brought in engagement with each other. Closing of limit switch LS-3 closes relay R8 which starts the heat timer TD3 and causes solenoid SC-5 to be energized. The four-way valve of solenoid SC-5 is also interconnected with mainfold distributor 314 and, when energized at the beginning of the heating cycle, allows a fast pressure buildup of hydraulic pressure which after a duration becomes constant, thus engaging the end workpieces with the rotating center workpiece 40 to frictionally rub against the abutting outer end surfaces of piece 40, thus starting the weld producing heating cycle initiated by energization of solenoid SC-5. Further advancement of push rod 230 triggers either the limit switch LS-4 causing solenoid SC-3 to be de-energized to release clutch 68 and thereby interrupt the power transmission to belt 94. If timer TD3 is used in place of switch LS-4, it will time out to cause deenergization of solenoid SC-3. Return air pressure from the clutch release causes pressure switch PS-3 to close thereby de-energizing solenoid SC-2 by which air pressure is allowed to apply brake mechanism 95 to stop rotation of drive shaft 76. When rotation of drive shaft 76 is completely stopped the speed sensing device 101 opens and acts through relays R4 and R1 to energize solenoid SC-1 whereby piston 189 is actuated for return movement to open jaw 158. Opening of jaw 158 closes limit switch LS-1 which latches into the brake circuit through relay R2 to keep brake mechanism 95 applied, and opens limit switch LS-2 which through one of its contacts closes the delay cycle control switch 592 thereby coupling relay timer TD2 into the circuit and connects it through relay R8 with the heat timer TD3. This prevents the heat timer from timing out, thus causing a delay before the final pushup to allow the weld to obtain a certain desired temperature before pressure forging which in some instances may be necessary to obtain a satisfactory weld.

At the same time, relay R8 is closed by LS-2 which, although the heat timer TD3 has actually completed its timing, retains the current in TD3 to prevent the heat timer from timing out as long as the delay timer TD2 is working and even though solenoid SC-5 is energized at the same time the still activated heat timer prevents operation of this solenoid. When jaw 158 is completely opened the other contact of limit switch LS-2 closes relay R15 which starts the delay timer TD2 on its timing cycle and also closes vent valve coil 616 which is in parallel with relay R15. When delay timer TD2 has timed out the current from the heat timer TD3 is removed opening relay R5 which in turn opens the reverse cycle control switch 584 and also causes solenoid SC-5 to operate to shift the valve of solenoid SC-5 to its second position thereby allowing the full accumulated high pressure from cylinder 320 to be directed through manifold 314 into cylinder 226 for final pushup to forge the welded pieces together. Simultaneously, reverse delay timer TD1 is started by the timing-out of TD2 which prevents reverse movement of piston 227 holding the final pressure for a short period whence limit switch LS-5 is triggered by the advancing push rod 230, since the reverse cycle control switch 584 is kept open by the open relay R5 although further advance of the push rod 230 is stopped. The purpose for a short delay of the return movement of piston 227 after final pushup allows the weld to cool and the weld surfaces. This is very important to provide a homogeneous weld structure. Otherwise, if, immediately after final pushup, the pressure would be abruptly released the reaction would break the weld.

When reverse delay timer TD1 has timed out it closes relay R10 which closes the jog back switch 584 and energizes solenoid SC-6 through closing of the relay R11 and de-energizes solenoid SC-4 and drain solenoid SC-4a causing through their associated valves pressure being released rearwardly of piston 338 and pressure being applied forwardly of piston 338 for return movement. The drain valve associated with solenoid SC-4a is then opened to drain excessive fluid back into the system. During reverse movement, because of the closed vent valve (which was closed by the vent valve coil 616), hydraulic pressure is built up in cylinder 320 for the start of the next cycle. As push rod 230 returns, limit switch LS-5 is opened and limit switches LS-4 and LS-3 are pressed over without any effect since they cannot operate when brake mechanism 95 is on. Simultaneously with the return movement of piston 227, pistons 322 and 326 in cylinders 320 and 324, respectively, also return to their original position. When limit switch LS-7 is opened by this return movement, one contact thereof removes the current from the delay timer TD2 so that the spring loaded timing mechanism customarily employed in such timers can return to its original position. In response to this return movement, the other contact of switch LS-7 opens vent valve coil 616 and relay R15 which removes the current from reverse delay timer TD1 to allow resetting of the mechanism. When the limit switch LS-6 at cylinder 226 is triggered (that is, opened), the hydraulic system will be unloaded and returned to its original pressure condition. At this time all control elements are returned to their initial position.

After the welded work is removed from the machine, new workpieces may be inserted and the foregoing cycle is repeated.

In FIGURE 7 an actual power force and displacement diagram which was electronically recorded during a complete welding cycle is illustrated. Prolonged tests proved that in metal bodies to be friction welded together an immediate force buildup (that is relatively rapid increase in axial force at the start of the heating cycle prior to a more gradual increase before the force levels off to a constant value) is desirable to appreciably shorten the welding time without causing any adverse effect on the quality of the weld. This initial rapid pressure buildup further considerably decreases noise and excessive vibrations during the initial "rubbing-in" stage and prevents the work from being thrown out of alignment.

As shown in FIGURE 7, the pressure at the start of the heating cycle may be relatively rapidly increased over a period of about 1 to 2 seconds. After this, pressure more slowly and gradually increases to approximately 15,600 pounds over a time period of about 14 seconds. At this pressure, the force remains constant for about another 11 seconds and then rapidly increases in a fraction of second to about 62,000 pounds pushup forging pressure at which point the force levels off to a constant holding pressure for another period of about 5 to 6 seconds to allow the weld to cool and become solidly fused. It will be noted that in the welding method diagrammatically illustrated in FIGURE 7 by employing the immediate pressure buildup system, which, as described earlier, is caused by closure of the vent valve by coil 616 upon return movement of piston 227, the pressure force at the end of the final pushup is held at the highest point of the pushup force. This further aids in achieving a more perfect weld in a shorter time. The total welding time as will be noticed is being appreciably reduced by this method.

The machine operation starts at point "0" when motor 54 is switched on. Brake mechanism 95 is released and clutch 68 is applied and the center workpiece starts to rotate. The work pressure piston 227 advances until at about 10 seconds after the workpieces contact each other and the "rubbing-in" period starts which is reflected by an abrupt high increase in power consumption which then tapers off to the operating power consumption value. At this point hydraulic pressure is abruptly increased as seen in the force diagram to rapidly obtain welding heat for the workpieces. It will be seen that total welding time for this particular workpiece from the start of the machine to the finished weld was not more than 44 seconds. Metal displacement for the desired work length was approximately ½ inch. This, of course, varies with different workpieces.

As stated earlier, this machine setup may also be used to friction-weld one workpiece at a time to another workpiece by holding one stationary and rotating the other, as for instance spindles welded onto tubular or other axle housings. In that case it is preferable to hold the axle housing stationary and rotate the spindle thereagainst. This can be accomplished with the same work belt drive 48 by providing a tubular adapter onto which the spindle can be chucked and rotating the tubular adapter in a manner similar as herein described for the center workpiece midsection 40.

Thus, a novel method and control means to friction weld relatively large articles has been provided. This means comprises an automatically controlled apparatus adaptable for a wide variety of workpieces in different sizes and shapes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for friction welding a plurality of metal parts comprising:
   (a) means for mounting one of said parts against axial displacement,
   (b) means for axially displaceably mounting another of said parts for axially aligned abutment with said one part; drive means for relatively rotating and axially engaging said parts,
   (c) means responsive to one predetermined condition for automatically connecting said drive means to relatively rotate said parts under sufficiently high engagement pressure to generate sufficient heat to render said engaging parts fusible in the regions of engagement,
   (d) means automatically responsive to another predetermined condition for abruptly arresting said relative rotation after said metal has become fusible by sequentially disconnecting said drive means and positively braking said relative rotation,
   (e) control means for automatically maintaining a predetermined engagement pressure after said relative rotation has stopped to permit the welds to form and cool, and
   (f) means responsive to said control means for releasing said engagement pressure.

2. The apparatus defined in claim 1 wherein said means for abruptly arresting said relative rotation comprises means responsive to a predetermined time delay after initiation of said relative rotation under engagement pressure for actuating said brake means.

3. In an apparatus for friction welding together two prefabricated metal sections of a relatively massive article such as a vehicle axle,
   (a) means for fixedly mounting one of said sections,
   (b) means for rotatably and axially slidably mounting the other of said sections for axially aligned abutment with said one section,
   (c) means for continuously rotating said other section and including a power source and movable drive means adapted to engage said other section,
   (d) a clutch actuatable to couple said power source to said drive means, and
   (e) a brake actuatable in cooperation with said drive means for abruptly arresting rotation of said other section,
the improvement comprising:
   (f) means automatically responsive to a predetermined condition for engaging said drive means with said other section,
   (g) means automatically responsive to engagement of said drive means with said other section for releasing said brake and engaging said clutch to impart rotation to said other section,
   (h) means responsive to release of said brake for exerting a continuous relatively heavy axial force upon said other section sufficient to displace it into frictional heat generating rotation surface contact with said one section and for maintaining said applied force and rotation until the generated heat renders the metal at the areas of rubbing contact fusible, and
   (i) means automatically responsive to a further predetermined condition for releasing said clutch and applying said brake means to abruptly arrest rotation of said other section after said metal has become fusible to permit the weld to form and cool.

4. The apparatus defined in claim 3 comprising means permitting engagement of said clutch only when said brake is disengaged.

5. The apparatus defined in claim 3 comprising
   (a) means providing separate pressurized air and hydraulic sources,
   (b) first, second, and third fluid motor means actuatable to respectively operate said clutch, said brake and said axial force exerting means,
   (c) means connecting said first and second motor means to said pressurized air source, and
   (d) means connecting said hydraulic source to said third fluid motor means.

6. The apparatus defined in claim 3 wherein said means for applying said brake and releasing said clutch comprises means responsive to a predetermined axial displacement of said other section.

7. The apparatus defined in claim 3 wherein said means for applying said brake and releasing said clutch comprises adjustable timer means for permitting heat-generating, surface-contact rotation of said other section only for a preselected time period.

8. The apparatus defined in claim 3 comprising speed-sensing means automatically responsive to arrestment of movement of said other section upon engagement of said brake for releasing said drive means from engagement with said other section.

9. The apparatus defined in claim 4 comprising means requiring said drive means to engage said other section before said clutch can be engaged.

10. The apparatus defined in claim 3 wherein said drive means comprises:
    (a) a power driven shaft and a belt and pulley assembly driven by said shaft and including an endless belt,
    (b) support means for said assembly and including a movable member cooperating to wrap said belt partly around the periphery of said other section for imparting rotation thereto, and
    (c) fluid motor means energizable to displace said member between positions for engaging and disengaging said belt with respect to said other section.

11. Apparatus for friction welding together three prefabricated sections of a relative massive article such as a vehicle axle, comprising:
    (a) means for fixedly mounting one of said sections,
    (b) means for nonrotatably and slidably mounting a second of said sections,
    (c) means for rotatably and axially slidably mounting a third one of said sections,
    (d) all of said sections being maintained in axial alignment with each other with adjacent end areas of said sections facing each other,
    (e) means including a drive element movable into engagement with said third section for imparting rotational movement thereto,
    (f) force applying means operable to exert a continued relatively heavy axial force upon said second section sufficient to relatively displace said sections into frictional heat generating rotating surface contact at said areas, and
    (g) automatic control means for friction welding said sections together comprising:
    (h) means for moving said drive element into engagement with said third section,
    (i) means automatically responsive to engagement of said drive element with said third section for operating said force applying means to exert said axial force on said second section and to maintain said sections in end-to-end frictional heat generating surface contact until the generated heat renders the metal at said areas fusible, and
    (j) means automatically responsive to a predetermined condition of abruptly arresting rotation of said third section after said metal becomes fusible and for maintaining said sections in engagement with a constant force to permit the welds to form and cool.

12. The apparatus defined in claim 11 comprising means automatically responsive to the arrestment of rotation of said third section for disengaging said drive element from said third section and for materially increasing engaging force for a predetermined time prior to the application of said contact force.

13. Apparatus for the friction welding of a plurality of metal workpieces to be joined to form an integral article comprising means for mounting said workpieces in alignment, means for relatively rotating said workpieces, means for moving said workpieces into frictional abutment and for axially forcing them together under sufficiently high engagement pressure during relative rotation to generate heat sufficient to render the metal fusible in the regions of frictional engagement comprising a hydraulic cylinder disposed in a hydraulic circuit, and control means effective after said engaged metal regions have become fusible and the fused metal has displaced to permit further relative movement of said workpieces a predetermined distance toward each other to automatically arrest said relative rotation of the workpieces while maintaining said axial pressure comprising an electrical system operably connected to valve means in said hydraulic circuit and containing switch means actuated upon said further relative movement of the workpieces.

14. Apparatus for the friction welding of a plurality of metal workpieces to be joined to form an integral article comprising means for mounting said workpieces in alignment, drive means for relatively rotating said workpieces comprising an electric motor connected through clutch mechanism and brake mechanism to rotate one of said workpieces, a first pneumatic motor for actuating said clutch mechanism and a second pneumatic motor for actuating said brake mechanism, a pneumatic circuit operably connected between a source of air pressure and said pneumatic motors, solenoid control valves in said pneumatic circuit for the respective pneumatic motors, means for forcing said relatively rotatable workpieces together under sufficiently high frictional engagement pressure for friction welding comprising a first hydraulic motor connected through a hydraulic circuit to a source of pressure, a solenoid valve in said hydraulic circuit for controlling said hydraulic motor, an electric control circuit operably connected to said electric motor and to said solenoid valves in said pneumatic and hydraulic circuits for providing synchronized actuation of all of said motors in predetermined automatic sequence.

15. The apparatus defined in claim 14, wherein the rotatable workpiece is mounted with an openable support, a second hydraulic motor operably connected to open and close said support, said motor being connected to said hydraulic circuit by conduit means containing a valve having a solenoid actuator connected into said electrical circuit.

16. In the apparatus defined in claim 15, means in said electrical circuit adapted upon initial energization of said circuit to accomplish a cycle of operation of said apparatus for first closing said support to drive couple said rotatable workpiece to said drive means.

17. In the apparatus defined in claim 16, means actuated by closing of said support for connecting said electrical circuit to actuate the brake mechanism motor control valve for releasing the brake mechanism in said drive means.

18. In the apparatus defined in claim 17, means actuated upon release of said brake mechanism for connecting said electrical circuit to actuate the clutch mechanism control valve for engaging the clutch and thereby conditioning the drive means to start rotating said rotatable workpiece.

19. In the apparatus defined in claim 18, a pneumatic pressure operated switch in the electrical circuit connected to be actuated by the air pressure operating said clutch motor electrically connected when so actuated to operate the solenoid valve for said first hydraulic motor to initiate movement of said workpieces together under pressure.

20. In the apparatus defined in claim 19, means automatically operable after the engaged relatively rotating regions of said workpieces have fused for disabling said drive means by disengaging the clutch mechanism and positively engaging said brake mechanism while maintaining the engagement pressure of said workpieces.

21. In the apparatus defined in claim 20, a time delay relay in said electrical circuit connected to hold the solenoid control valve for said first hydraulic motor positioned to maintain said first hydraulic motor in engagement pressure for a predetermined period after said relative rotation of the workpieces is stopped.

22. In the apparatus defined in claim 21, means actuating the second hydraulic motor to open said support when relative rotation of the workpieces is arrested, and a switch in said electrical circuit operated by said opening of said support to actuate said time delay relay.

23. Apparatus for the friction welding of a plurality of metal workpieces comprising means mounting said workpieces in axial alignment, drive means relatively rotating said workpieces, means forcing said relatively rotatable workpieces into abutting engagement and applying axial pressure whereby the abutting ends of said workpieces are rubbed together under pressure comprising control means automatically applying said axial pressure at a first rapidly increasing pressure rate for a relatively short period of time, and then under an increasing pressure at a second and slower rate for a relatively longer period of time until a predetermined pressure level is reached, and means to automatically substantially further increase engagement pressure after the metal has become plastic in the area of contact for a predetermined amount of time after relative rotation between said workpieces has been stopped to complete the weld.

24. Apparatus for friction welding comprising:
  (a) means for supporting at least three workpieces for relative rotation about a common axis and at least two of said workpieces for limited axial movement along said axis;
  (b) stationary motor means;
  (c) means drive connecting said stationary motor means to drive the rotatable ones of said workpiece supporting means; and
  (d) means for forcing said workpieces together axially whereby the abutting ends of said workpieces are rubbed together under pressure.

25. The apparatus defined in claim 24 wherein said last named means comprises a source of fluid under a predetermined pressure and means responsive to said predetermined pressure for moving axially the moveable ones of said workpieces so that the ends of said workpieces are in abutment and the intermediate one of said workpieces is subjected at its opposite ends to equal and opposite forces.

References Cited

UNITED STATES PATENTS

| 3,162,068 | 12/1964 | Hardy | 29—470.3 |
| 3,134,278 | 5/1964 | Hollander et al. | 228—2 |
| 3,388,849 | 6/1968 | Blum | 228—2 |

OTHER REFERENCES

Vill': Friction Welding of Metals, American Welding Society, 1962 (published in 1959 in Russia), pp. 70–78.
Zvaranie: VI/4, 1957.
Zvaranie: VI/11, 1957.
Zvaracsky Sbornik: Sav v, 3, Bratislava, 1957.

RICHARD H. EANES, Jr., Primary Examiner

UNITED STATES PATENT OFFICE
CERTIFICATE OF CORRECTION

Patent No. 3,455,494                                            July 15, 1969

Alex F. Stamm

It is certified that error appears in the above identified patent and that said Letters Patent are hereby corrected as shown below:

In the heading to the printed specification, lines 5 and 6, "North American Rockwell Corporation, a corporation of Delaware" should read -- Rockwell-Standard Company, Pittsburgh, Pa., a corporation of Delaware --. Column 2, line 8, "succesively" should read -- successively --; same column 2, after line 68, insert -- Figure 6A is a fragmentary, diagrammatic view of a portion of the apparatus shown in Figure 1 --. Column 4, line 25, "this" should read -- This --. Column 5, line 72, "workpiece" should read -- workpieces --. Column 6, line 44, "perior" should read -- period --; line 73, "deepnding" should read -- depending --. Column 7, line 2, "rotation" should read -- rotational --. Column 9, line 4, after "by" insert -- the --. Column 11, lines 29 and 30, cancel "arm of the first contact and one termial of the coil of relay". Column 12, line 73, "is" should read -- in --. Column 13, line 36, "workpiece" should read -- workpieces --. Column 14, line 31, "CS-3" should read -- SC-3 --. Column 19, line 45, "with" should read -- within --.

Signed and sealed this 28th day of July 1970.

(SEAL)
Attest:

EDWARD M. FLETCHER, JR.                                WILLIAM E. SCHUYLER, JR.
Attesting Officer                                            Commissioner of Patents